Sept. 18, 1962 J. B. CASTLE, JR 3,054,317
HYDRAULICALLY POWERED SHEAR
Original Filed June 25, 1954 8 Sheets-Sheet 6

INVENTOR
James B. Castle Jr.
BY Bruce & Brosler
ATTORNEYS

Sept. 18, 1962 J. B. CASTLE, JR 3,054,317
HYDRAULICALLY POWERED SHEAR
Original Filed June 25, 1954 8 Sheets-Sheet 8

INVENTOR
JAMES B. CASTLE Jr.
BY Bruce & Brosler
ATTORNEYS

United States Patent Office 3,054,317
Patented Sept. 18, 1962

3,054,317
HYDRAULICALLY POWERED SHEAR
James B. Castle, Jr., 221 Park Way, Piedmont, Calif.
Original application June 25, 1954, Ser. No. 439,349. Divided and this application Dec. 22, 1958, Ser. No. 782,268
1 Claim. (Cl. 83—399)

The present invention relates in general to hydraulically powered machines with movable rams and more particularly to a shear in which the ram constitutes a shearing blade.

This application is a division of my application for Hydraulically Powered Machine, Serial No. 439,349, filed June 25, 1954.

Among the objects of my invention are:

(1) To provide a novel and improved power shear.

(2) To provide a novel and improved power shear of the hydraulic type in which the established rake angle of the movable knife or blade is reset during each cycle of operation to avoid the effects of an accumulation of departures from the established angle.

Additional objects of the invention will be brought out in the following description of a preferred embodiment of the same as applied to a shear, taken in conjunction with the accompanying drawings, wherein, FIGURE 1 is a front view in elevation of a hydraulically powered shear incorporating the present invention;

FIGURE 9 is a view partly in section of a hold down device embodied in the machine of FIGURE 1.

Figure 1:
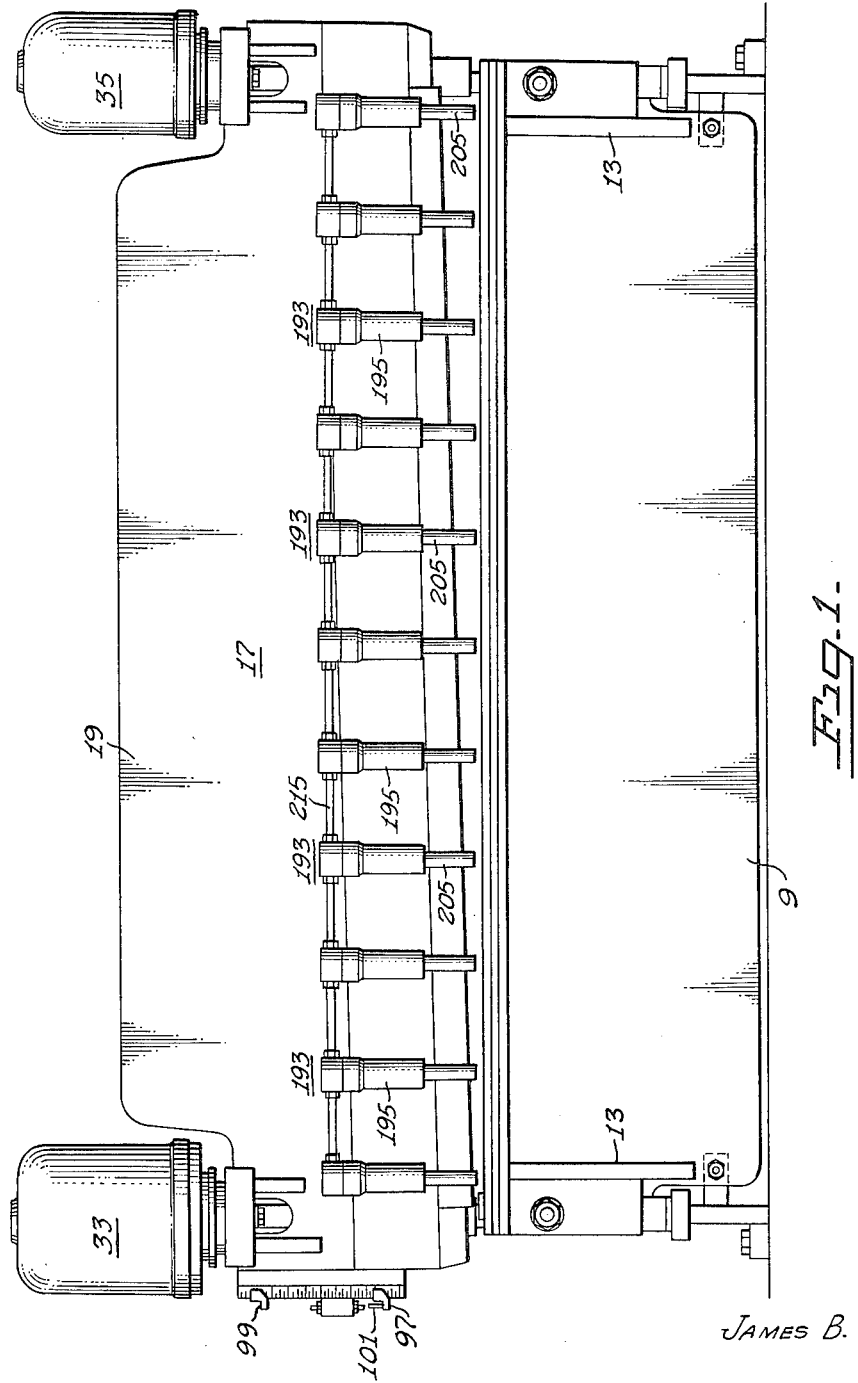
Figure 2:
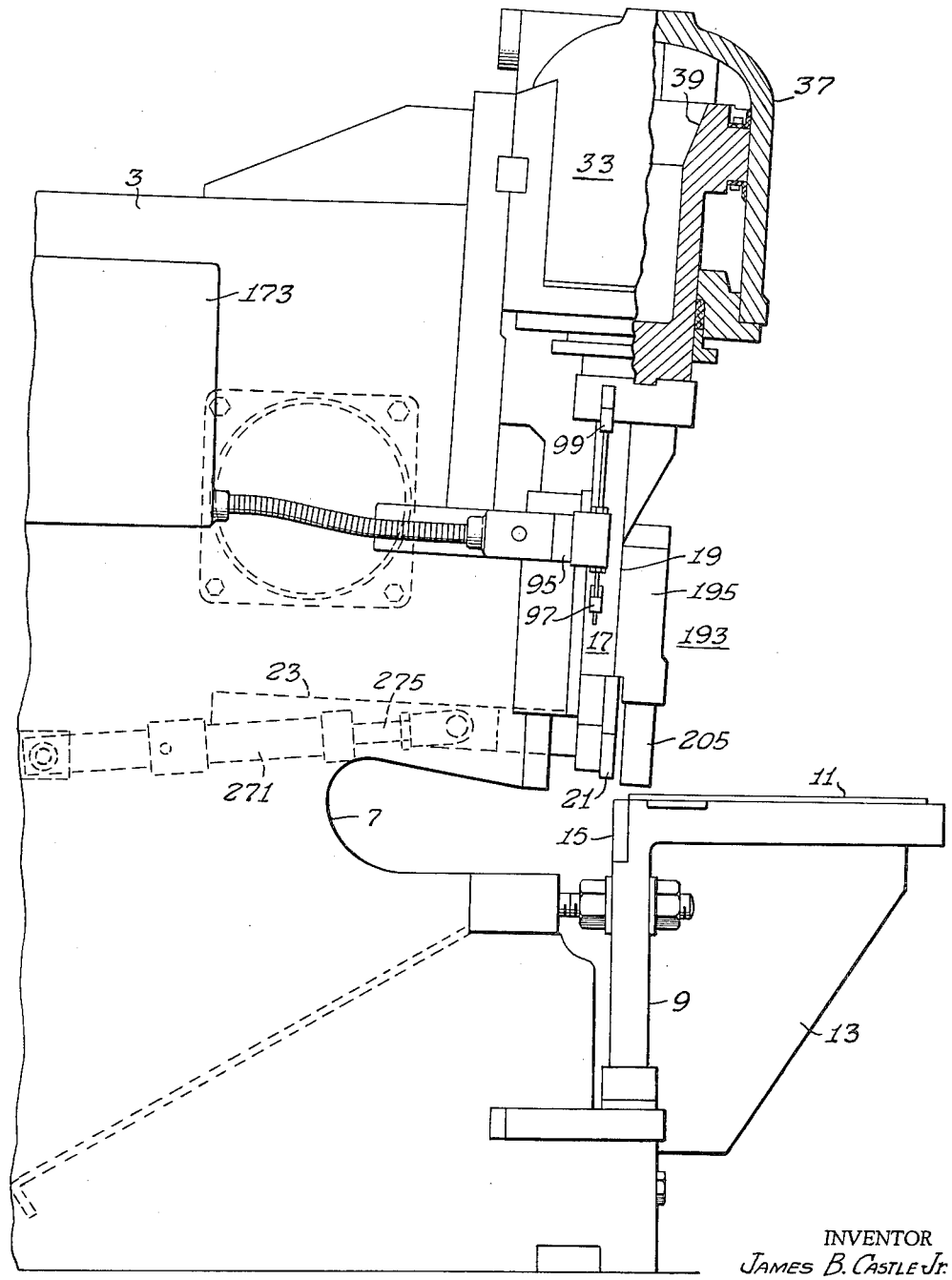
FIGURE 2 is a left side view in elevation of the shear of FIGURE 1, with an included drive cylinder assembly in section.
Figure 3:
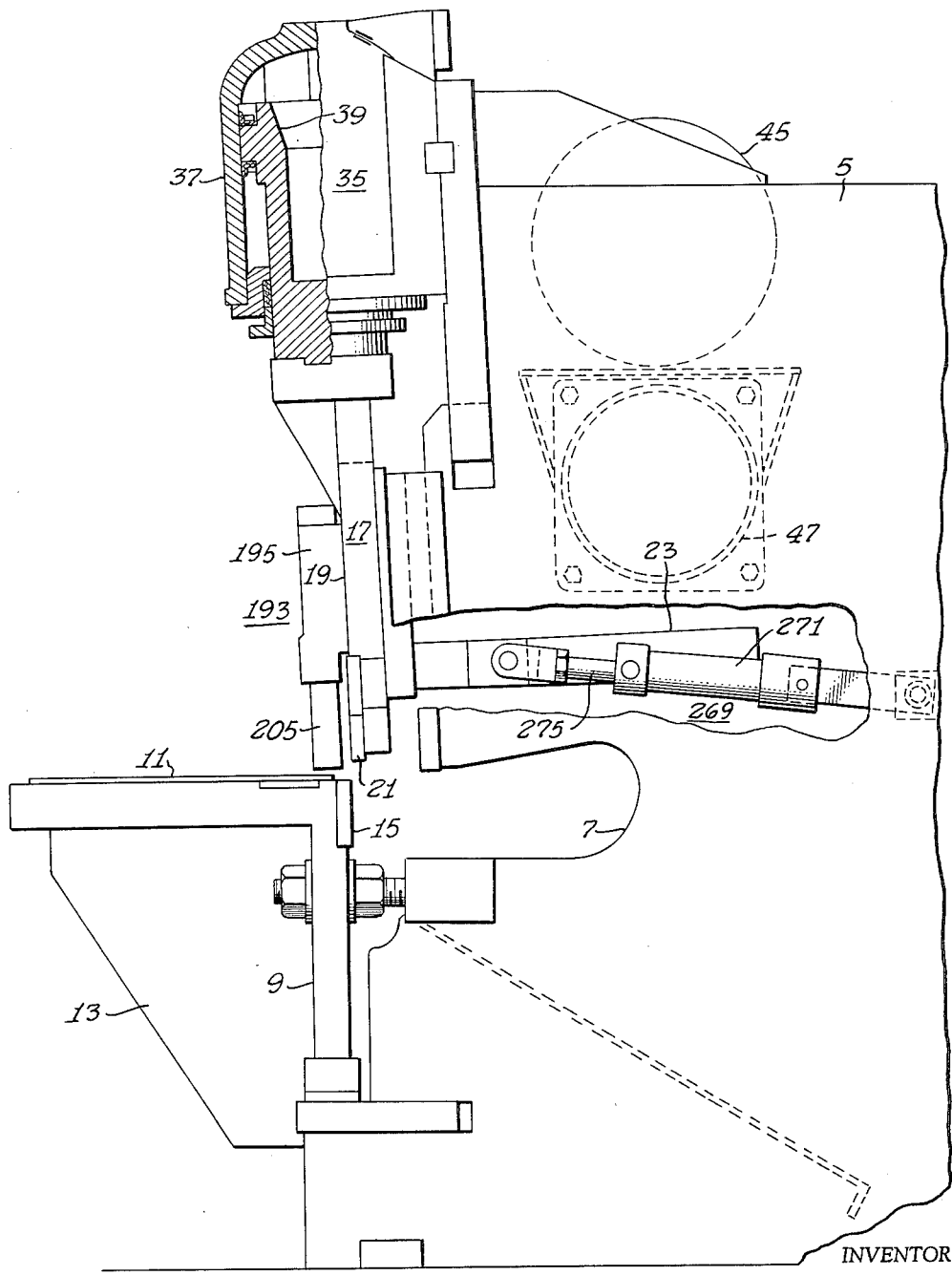
FIGURE 3 is a similar view in elevation, of the right side of the machine of FIGURE 1.
Figure 4:
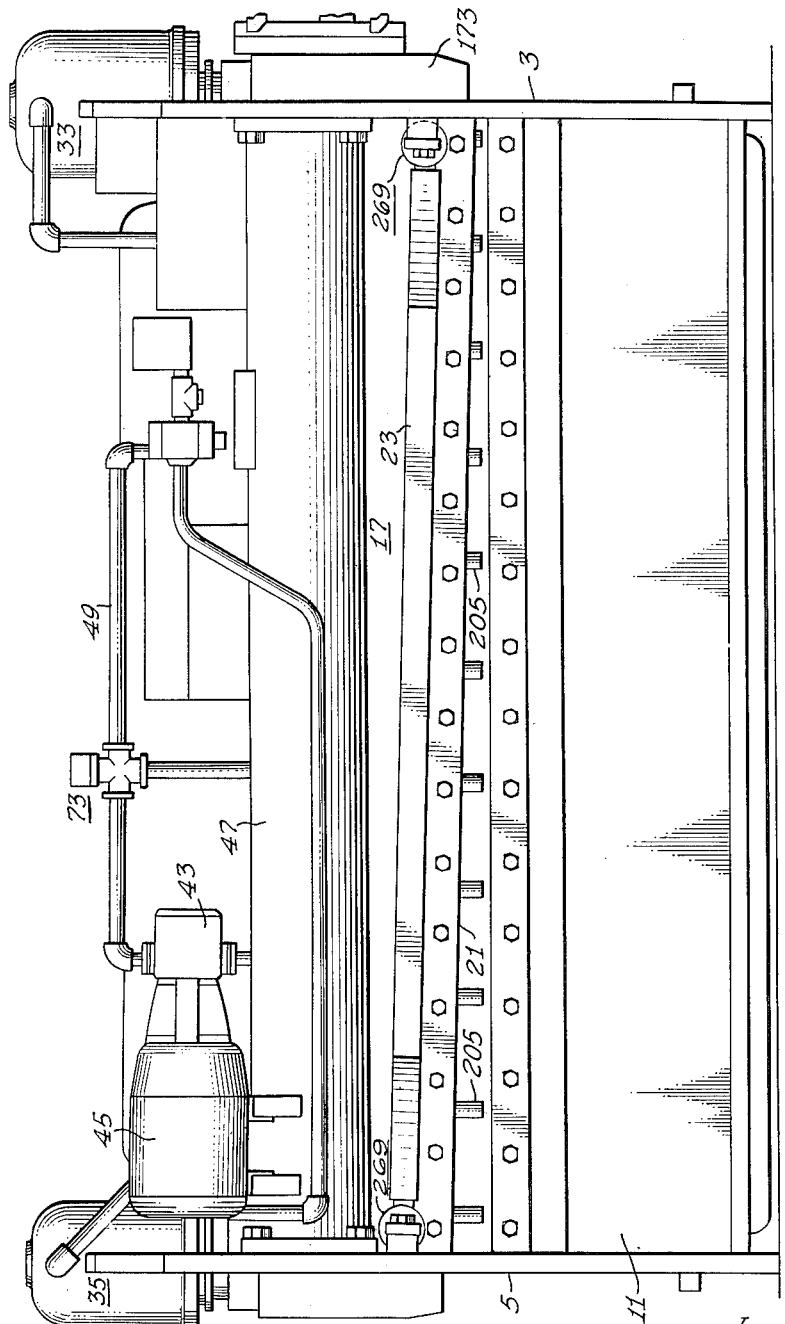
FIGURE 4 is a rear view of the shear of FIGURE 1.
Figure 5:
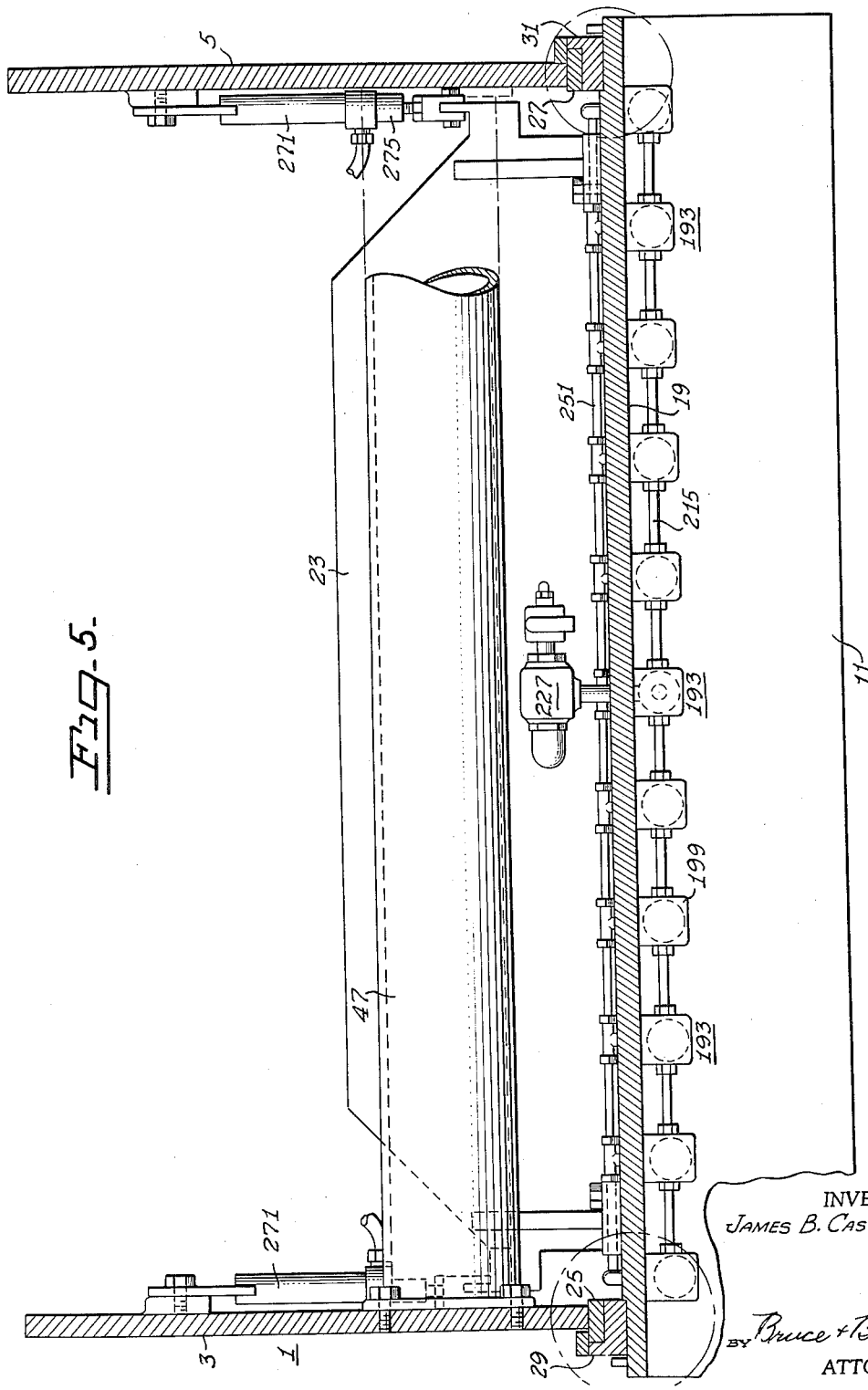
FIGURE 5 is a plan view of the shear of FIGURE 1 looking down from above.

Referring to the drawings for details of the invention in the form of a hydraulically powered shear, the same comprises a frame 1 involving a pair of spaced side walls 3 and 5, each formed with a relatively deep throat 7 in the front edge thereof. Joining the side walls along the front edges below the throats, is a front wall 9, while extending outwardly from the front wall along its upper edge is a work table 11, the front wall and table being formed into a rugged unit by integral brackets 13 extending from the front wall in supporting relationship to the table.

The front wall and table unit is recessed at the junction of the table and front wall to receive a stationary blade 15 forming a component of the shearing mechanism.

The front edge portions of the side walls above the throats are set back somewhat to permit of supporting the ram or movable blade 17 of the shearing mechanism in proper relationship to the fixed component. Such movable blade includes a main body portion 19 and a shearing component 21 affixed thereto at an angle to the horizontal, along the lower edge thereof, and is strengthened by a horizontal bracing rib 23 of substantial depth.

For the purpose of mounting the blade, a pair of ways 25, 27 are affixed to the upper front edges of the side walls, such ways being tilted at a very slight forward angle of the order of 2 degrees, preferably by forming the edges of the side walls at such an angle, and the blade is slidably mounted on the ways by guide channels 29, 31 affixed to the rear side of the blade and in engagement with the ways.

The operating movements of the blade are controlled hydraulically by a system including a left cylinder assembly 33 and a right cylinder assembly 35, fixed to the upper front edges of the side walls of the housing and coupled to the blade. Thus each end of the blade will be powered by one of these cylinder assemblies.

Each cylinder assembly involves a closed dome shaped cylinder 37 which is affixed to the upper front edge of the associated side wall and includes therein a recessed piston 39 extending through the lower end of the cylinder for connection to the upper edge of the blade.

Hydraulic pressure is derived from a pump 43 operated by an electric motor 45, the pump having its suction end connected to a reservoir or supply tank 47 and its discharge end connected through a flow line 49 to a three-position main operating valve 51. This main operating valve normally occupies a neutral position as illustrated in the drawings, in which position the pump is connected directly back to the tank, thus by-passing the rest of the system. The valve is capable of being shifted in either of opposite directions to occupy either one position which determines the work stroke of the blade, or another position which determines the return stroke of the blade. The direction of shift is determined by selective energization of one of a pair of solenoids 53 and 55 associated with the valve, that solenoid 53 which determines the work stroke of the blade being designated the "down" solenoid, while the other solenoid 55 which determines the return stroke of the blade, is designated the "up" solenoid.

In lieu of utilizing a conventional tank for holding the supply of liquid, it is noted that the tank 47 is in the form of a section of pipe of substantial diameter connected between the side walls of the frame and thus constituting a structural member of the frame.

From the main operating valve, a flow line 57 extends to and enters the left cylinder at a point above the piston. From a point in that cylinder below the piston, a connecting line 59 couples this cylinder to the right cylinder at a point above the piston enclosed therein, while from a point in the right cylinder below the piston, a line 61 leads back to the main operating valve.

Included in this latter line, is a counter-balance valve 63. The counter-balance valve employed at this point, is a conventional type valve having a normally closed passage 65 therethrough, but which is adapted to be shifted to a connecting position against a spring load 67 by pressure of liquid applied through a branch passage 69 to overcome the action of the loading spring. Thus, in order for liquid to flow through such valve, the pressure of liquid in the system in the direction of the flow through the valve must first build up to a value sufficient to overcome the spring load. Such spring loading may be fixed at any desired value, determined by the operating requirements of the system.

The counter-balance valve referred to is by-passed in the direction of reverse flow, by a check valve 71 which permits free flow of liquid around the valve with essentially no pressure drop at this point in the system.

It will be apparent that the system as thus far described, provides for a series connection of the cylinder assemblies, and that the work performed by the piston in the left cylinder will be apportioned between that imparted to the blade at that end and the work performed by the piston in the right cylinder, as conveyed to such piston through the connecting line between the two cylinders.

With the "down" solenoid energized, the main operating valve will be shifted to the left, as viewed in the drawing, whereby the pump will be connected to the left cylinder and the return line from the right cylinder will be connected back to the tank from which the pump draws its supply of liquid. Under these conditions, the blade will be forced downward under relatively low pressure determined by the spring loading on the counter-balance valve, until the blade engages the work, when the pressure in the system will necessarily rise to a value sufficient to perform the shearing operation.

With the "up" solenoid of the main operating valve energized, this valve will be shifted to its extreme right position as viewed in the drawing, whereupon, the pump will be connected to the lower end of the right cylinder through the check valve, while the line from the left cylinder will be connected to the tank. The resulting reverse flow of liquid in the system will serve to raise the blade to its up position. At its up position, it will be retained due to the spring loading of the counter-balance valve which is made more than adequate to resist dropping of the blade under its own weight.

As a protection against pressures substantially beyond safe operating values, a spring loaded relief valve 73 is connected between the discharge side of the pump and its source of supply, the tank 47.

An important feature of the basic system, as thus far described, resides in the means provided for assuring equal rate of travel of both ends of the blade at all times. This is accomplished in the most simple manner, which becomes an inherent part of the operation of the system, by so constructing the cylinder assemblies that the under side 75 of the left piston equals in area, within manufacturing tolerances, the area of the upper surface 77 of the right piston. When so dimensioned, all other factors remaining constant, both pistons will inherently move at the same rate.

A study and analysis of the series hydraulic drive system described, shows that total power applied to the blade, while it remains constant under constant load conditions, varies in respect to the ratio of apportionment between the ends of the blade in accordance with the progressively shifting load as shearing takes place. Such apportionment of applied power, furthermore, is such as to maintain equilibrium of moments about the continually shifting point of contact between the blade and the work during shearing.

Operations of the blade are initiated by an operator through the expediency of a foot controlled switch 79 forming a component of an electrical system, which not only includes the various solenoids associated with the many valves of the basic hydraulic system previously described, but also an upper limit switch 81 and a lower limit switch 83 mounted on the machine, for determining the beginning of the stroke of the blade and the termination thereof.

The upper limit switch is a single contact switch of the normally closed type involving a spring armature 85 in engagement with a contact 87 while the lower limit switch is of the double acting type having a spring armature 89 normally in contact with an upper contact 91 while out of engagement with a second contact 93. Both limit switches are carried by a bracket 95 affixed to a side wall of the machine, with the switches in position to be engaged by an upper limit stop 97 and a lower limit stop 99 mounted on the blade.

The upper limit stop may take the form of an adjustable screw 101 threaded in the end of an L-shaped bracket 103, while the lower limit stop may take the form of a cylinder 105, closed at one end and disposed over the upper end of the L-shaped bracket. This cylinder has its lower edge 107 cammed for engagement with the lower limit switch at a selected point on the cammed edge determined by rotational adjustment of the cylinder, to effect a change in stroke of the blade, which in turn can be relied on to effect a change in the length of cut of the blade, it being recalled, that the lower edge of the blade is angularly disposed with respect to the horizontal.

Any suitable means may be relied upon for holding such an adjustment, and as one example, the upper end of the L-shaped bracket might be reduced and passed through the upper or closed end of the cylinder to receive a nut 109, with a compression spring 111 disposed between the nut and the adjusting cylinder. By forming the cammed cylinder with a flange 113 at its upper end, a hand grip is provided to facilitate the making of adjustments.

The foot controlled switch is of the normal open type and involves a foot operated armature 115 adapted, upon foot actuation thereof, to make connection with a contact 117 which is connected to one side of a power supply 119. The armature in turn is connected to the armature of the lower limit switch, which in the upper position of the shear blade, contacts the upper contact of such switch. This contact is in turn connected to the other side of the power supply through a pair of normally bridged contacts 121 of an "up" relay 122 and a pair of series connected windings 123, 125 of a timing relay 127. One of such windings 123, controls a pair of associated normally open contacts 129 which, in response to energization of the winding 123, close a circuit through the winding 131 of a "down" relay 132.

This "down" relay controls a pair of normally bridged contacts 133 and two pairs of normally open contacts 135 and 137 respectively. When energized, one of the pairs 135, of normally open contacts, closes a circuit from the power supply through the "down" solenoid 53 associated with the main operating valve, to shift the main operating valve to a position for producing a down or work stroke of the shear blade.

Immediately upon initiation of the down stroke of the blade, the upper limit stop is withdrawn from engagement with the upper limit switch, thus permitting this upper limit switch to close. The contact of this switch is connected to the blade 141 of a single pole switch 143 whose contact 145 is connected through the winding 147 of the "up" relay, to one side of the power supply, while the armature of the upper limit switch is connected through the pair of normally bridged contacts 133 of the "down" relay to the other side of the power supply.

However, since at this moment the "down" relay is energized and its normally bridged contacts are open, nothing happens upon such closing of the upper limit switch, even were the single blade switch closed.

As the shear blade reaches the lower limit of its stroke, as determined by the setting of the cammed cylinder, contact with the upper contact of the upper limit switch is broken, while at the same instant, engagement of the armature with the lower contact is effected.

Opening of the circuit at the upper contact serves to de-energize the timing relay 127, whereupon the circuit through the winding of the "down" relay is opened and the contacts thereof restored to normalcy. The opening of the contacts in the circuit of the "down" solenoid, de-energizes the "down" solenoid and permits the main operating valve to restore itself to its neutral position and thereby halt the downward movement of the shear blade.

Restoration of the contacts of the "down" relay to normalcy, will further complete a circuit by way of its normally closed contacts 133 through the upper limit switch and the wniding of the "up" relay, if the single pole switch 143 in circuit with the winding of such relay is in its closed position. Under such condition, the "up" relay will then become energized, and through the resulting bridging of a pair of normally open contacts 149, will establish a circuit to the "up" solenoid of the main operating valve and cause such valve to shift to that position which determines upward movement of the blade, to thereby initiate a return stroke of the blade.

Such upward movement of the blade will continue until the upper limit stop engages the upper limit switch and opens the same, thereby de-energizing the "up" relay, which in turn will open the circuit to the "up" solenoid and cause the main operating valve to establish itself again in its neutral position, whereby the blade will come to a halt at the upper limit of its return stroke.

During the downward or work stroke of the blade, the travel of the blade is under control of the foot control switch, whereby upon removal of foot pressure at any point in the work stroke, the blade may be brought to a complete halt, or moved downwardly at increments at the will of the operator, until the lower limit of travel is reached, as determined by opening of the lower limit switch. At this moment, if the single pole switch is in closed position, the "up" solenoid will become energized and take over, and start the blade on its return stroke.

With such single pole switch in its open position, the blade will come to a dead stop at the lower limit of its work stroke.

Should the nature of the work to be performed, make it desirable to permit uninterrupted movement of the blade during its down stroke and thereby relieve the operator of the necessity of maintaining foot pressure on the foot control switch throughout such stroke beyond the point of initiating such stroke, this objective can be accomplished by shunting the switch following initiation of the work stroke of the blade. A shunting circuit across the foot control switch, including a single pole switch 151 and the pair of normally open contacts 137 of the "down" relay will, when the single pole switch is closed, serve this purpose, for it will become apparent that upon energization of the "down" relay, the shunting circuit will be completed, thus rendering the foot control switch ineffective throughout the remainder of the work stroke.

Figure 6:
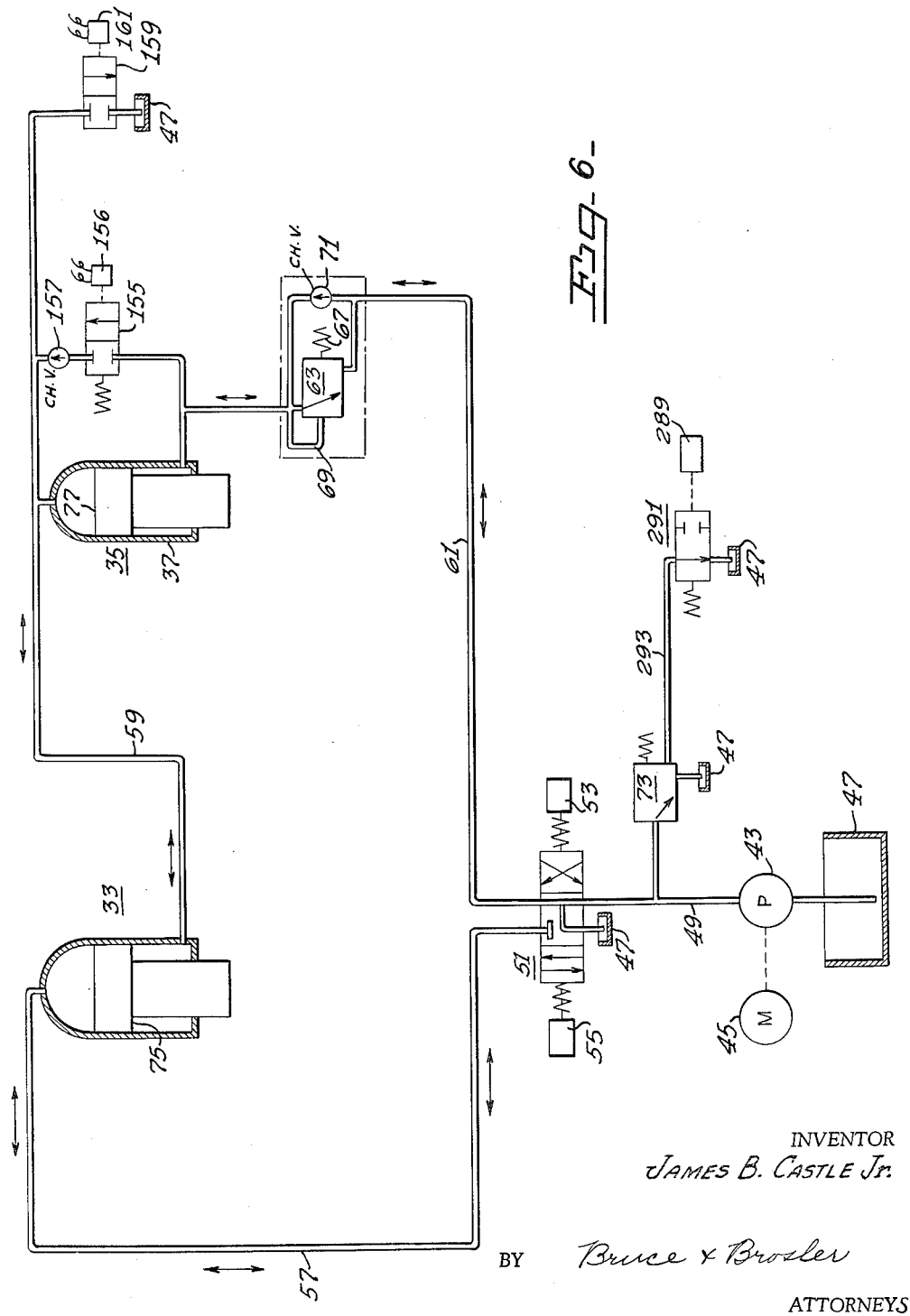
FIGURE 6 is a schematic view of a hydraulic system for powering the shear blade of the machine of FIGURE 1.
Figure 7:
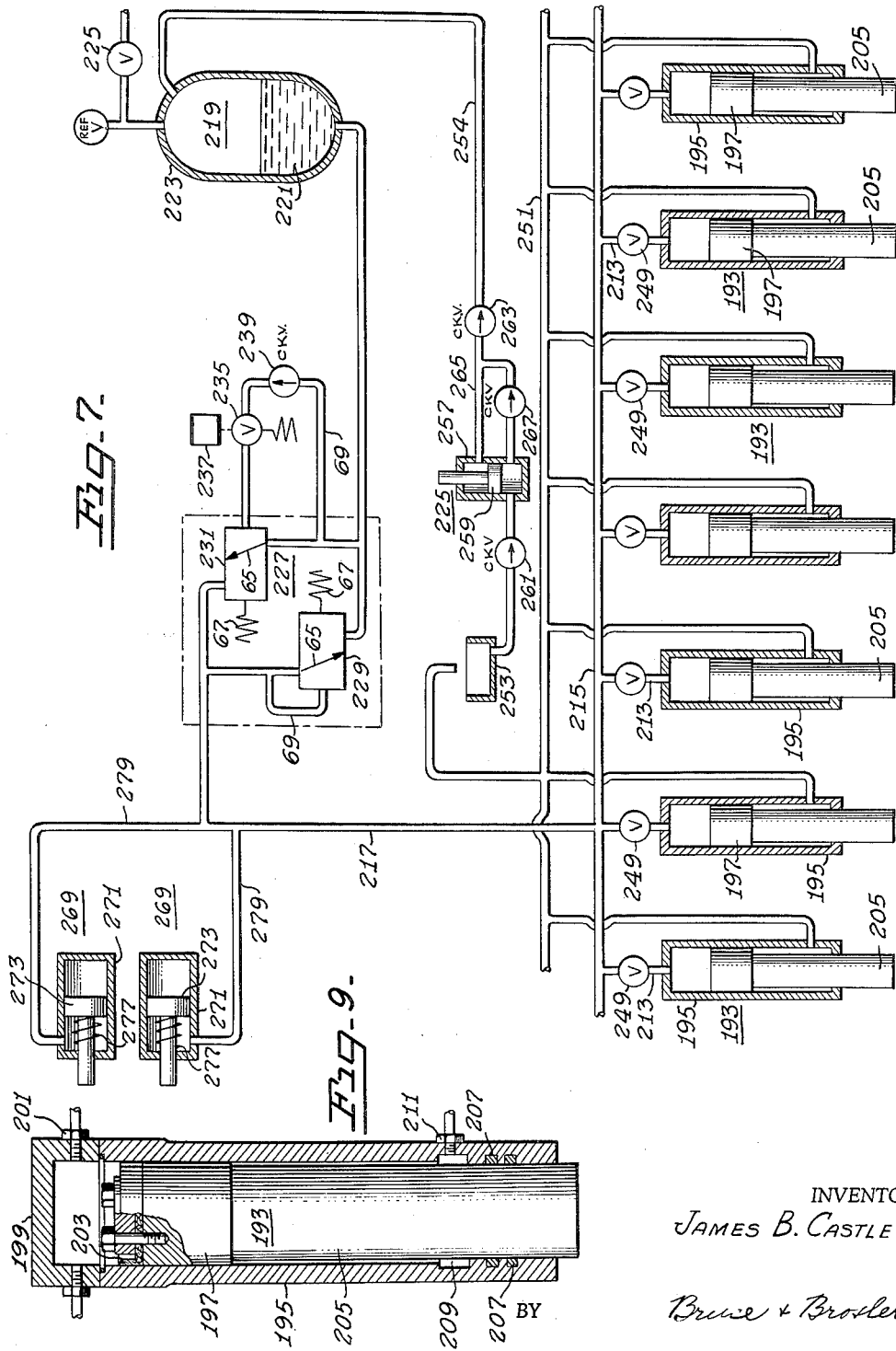
FIGURE 7 is a schematic view of a hydraulic system for operating associated components of the machine of FIGURE 1.
Figure 8:
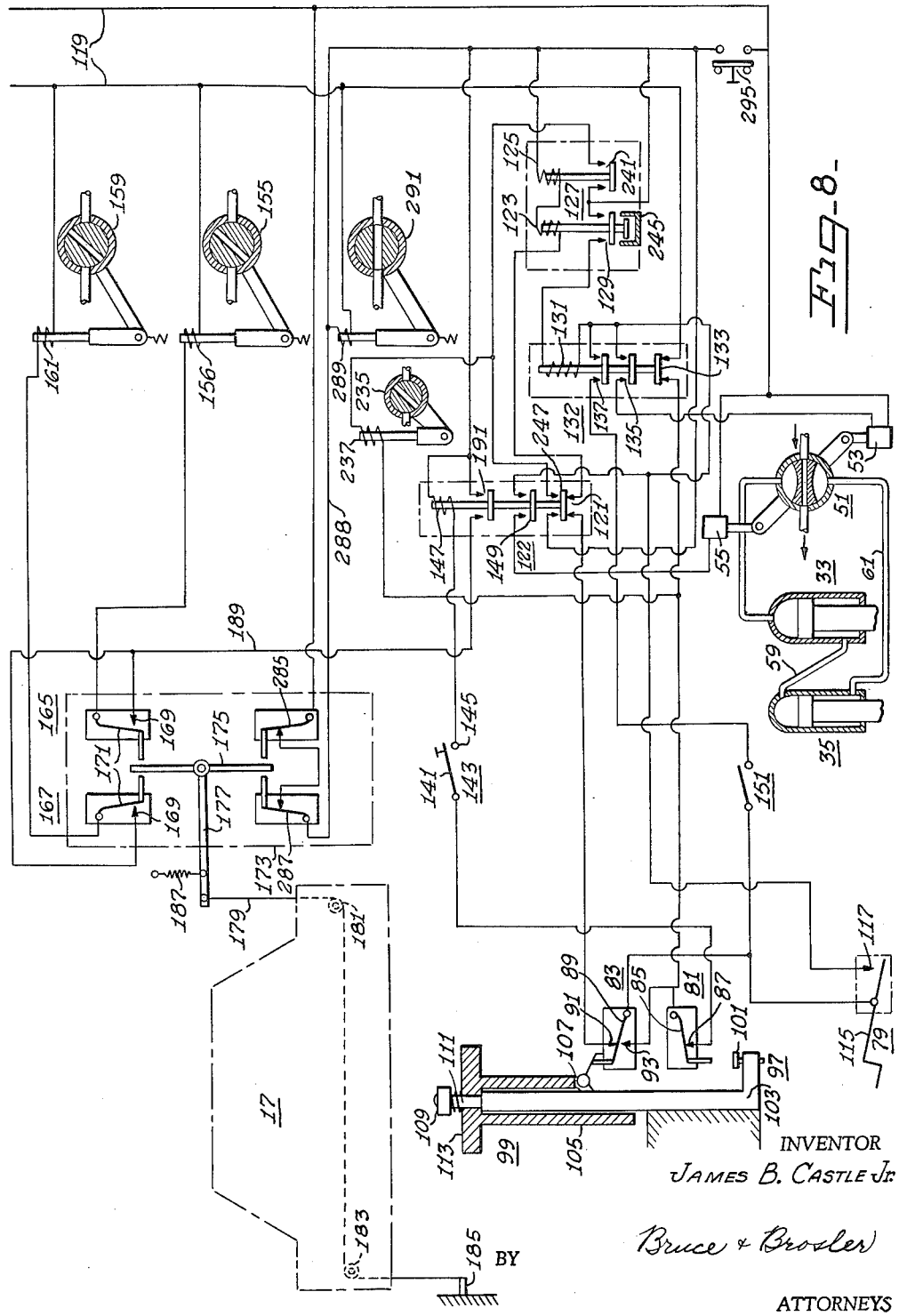
FIGURE 8 is a wiring diagram depicting the electric circuits involved in controlling the operation of the operation of the machine of FIGURE 1.

Referring back to the hydraulic system of FIGURE 6, there is included therein, means for leveling off the blade in the event the blade, for some reason or other, assumes a slight tilt. Toward this end, the right cylinder assembly 35 is shunted by a normally closed valve 155 in series with a check valve 157 permitting flow of liquid only in the direction existing during an "up" stroke of the shear blade. The valve 155 is electrically actuable through an associated solenoid 156.

A second normally closed valve 159 is connected between the upper end of the right cylinder assembly and the supply source or tank 47 and like the valve 155, is electrically actuable through a solenoid 161.

Upon energization of the solenoid of the first valve 155, which opens the valve, the liquid flow will by-pass the right cylinder assembly 35 and flow through the connecting line 59 to the underside of the piston in the left cylinder assembly 33, to thereby exert a lifting force against this piston to the exclusion of the piston in the right cylinder assembly. Thus the opening of this valve 155 will function to compensate for a situation where the piston in the left cylinder assembly lags that in the other.

On the other hand, energization of the solenoid of the second valve 159 which effects a connection to the tank from the upper end of the right cylinder assembly, will establish an effective by-pass around the left cylinder assembly 33 and thereby produce a lifting force on the piston of the right cylinder assembly to the exclusion of the piston in the other assembly, to correct a situation where the right piston lags the left piston.

In causing these leveling valves to respond to tilting of the blade, the solenoid 156 of the valve 155 is connected across the electrical power supply through a normally open micro-switch 165, while the solenoid 161 of valve 159 is similarly connected through a normally open micro-switch 167, with each switch involving a contact 169 in normal open relation to an actuable armature 171 and both switches being disposed in opposing relationship to each other in a housing 173 affixed to a side wall of the machine.

A bar 175 pivotally mounted at an intermediate point thereof, in said housing with its upper end lying between the actuable armatures of the level control micro-switches, is adapted to close one or the other of the switches when swung in one direction or the other on its pivot axis.

To convert the tilt of the blade to appropriate swing of the pivot bar, a lever 177 extending from the pivot bar has its free end coupled to one end of a cable 179 which runs downwardly under a pulley 181 mounted on the back of the blade just below the lever, such cable then extending across the back of the blade and over another pulley 183 mounted on the back of the blade at the opposite end thereof. The cable is then anchored to a bracket 185 mounted on the side wall of the machine adjacent that end of the blade. Tension on the cable is maintained by a spring 187 holding the lever arm in a position which will maintain the pivot bar out of contact with the micro-switches when the blade is in a level position.

It will be apparent, therefore, that should the blade tilt in one direction or the other, the pivot bar will be actuated accordingly, to close one or the other of the micro-switches and thereby actuate the proper leveling valve to restore the blade to its level condition.

Inasmuch as leveling is corrected only on the "up" stroke of the blade, the electrical circuits for the leveling valves, by way of a common line 189, are run through a normally open pair of contacts 191 on the "up" relay, whereby operation of the leveling valves can occur only following energization of the "up" relay.

In connection with the movements of the shear blade, it is quite essential that the work upon which the blade is to perform its shearing function, shall be immobilized during a shearing operation to ensure accuracy in the results sought. A feature of the present machine is the provision of a plurality of hold down devices 193 which are, in accordance with the present invention, mounted on the movable shear blade for movement therewith.

Each of these hold down devices involves a cylinder 195, a piston 197 slidable therein, and a cylinder head 199 closing the upper end of the cylinder and having means in the form of a pipe fitting 201 for the introduction of liquid into the cylinder under pressure, for actuation of the piston.

The piston may be slidably sealed to the inner wall of the cylinder by a conventional cup leather seal 203, and is formed with an intregal hold down rod 205 extending through the lower end of the cylinder where it is slidably sealed thereto by O-rings 207 resting in grooves formed on the inner wall of the cylinder adjacent the lower end thereof.

At a location intermediate the piston and the O-ring seals, the cylinder is provided with an inner wall groove 209 to trap any oil which may leak past the piston, thereafter to be withdrawn from the cylinder through a suitable fitting 211 passing through the wall of the cylinder at that point, thus to preclude possible leakage past the O-rings and on to the work. The groove and fitting at the same time serve to vent the cylinder and thereby permit reciprocation of the piston therein.

Each of the aforementioned hold down devices is connected at its upper end by a pipe connection 213 to a manifold 215 which in turn is connected through a flow line 217 to an accumulator or pressure tank 219 wherein a supply 221 of oil is maintained under pressure of an air cushion 223, the tank having a valve fitting 225 for air charging the tank when necessary to provide the proper conditions therein.

In the flow line to the pressure tank, is a hold down control valve assembly 227 involving a pair of normally closed counter-balance valves 229, 231 reversely disposed in parallel branch connections whereby flow in either direction in the flow line 217 may be realized, depending upon which of the counter-balance valves is actuated from its normally closed condition to an open condition.

As previously explained, a counter-balance valve is a conventional type valve having a normally closed passage 65 therethrough, which is adapted to be shifted to a connecting position against a spring load 67 by pressure of liquid applied through a branch passage 69 to overcome the action of the loading spring.

In connection with that counter-balance valve 231, which permits flow to the hold down devices, a normally closed hold down pilot valve 235, electrically actuable through energization of an associated solenoid 237, is coupled into the branch passage of this valve, in series with a check valve 239 permitting flow in this branch passage only in the direction of opening of the counter-balance valve with which it is associated.

The solenoid 237 of the hold down pilot valve is electrically connectible in a circuit across the power supply through the normally open contacts 241 associated with the second winding 125 of the timing relay 127 and the normally closed pair of contacts 133 of the "down" relay. Insofar as this circuit is concerned, it will be apparent that the hold down pilot valve will become energized immediately upon energization of the timing relay 127, which occurs in response to closing of the foot operated switch with the shear blade at its "up" position.

In response to such energization of the hold down pilot valve, a free flow of liquid under pressure of the air cushion in the pressure tank, will be permitted to the upper ends of the cylinders of the hold down devices whereby the piston in each of such devices will be urged toward the work from a normally extended position.

By associating a dash pot 245 with the normally open contacts of the first winding 123 of the timing relay, a time delay may be introduced in the energization of the "down" relay, sufficient to permit the pistons of the hold down devices to move down and engage the work, before the down relay is energized and opens the circuit to the hold down pilot valve. Thus by the introduction of such time delay, the hold down pistons will be in engagement with the work prior to the movement of the shear blade toward the work.

With downward movement of the shear blade, the hold down cylinders will be forced down over their pistons thus driving oil out of the cylinders and back into the pressure tank, but through the other counter-balance valve 229. By adjustment of the spring loading of this valve, adequate hold down pressure by the hold down pistons, will be automatically realized in response to such downward movement of the shear blade.

Referring again to the electrical circuit diagram in the drawings, it will be noted that the solenoid 237 of the hold down pilot valve is also connectible across the power supply through the normally closed pair of contacts 133 of the "down" relay and a normally open pair of contacts 247 of the "up" relay, whereby when the "down" relay is de-energized and the "up" relay is energized, the hold down pilot valve solenoid will be connected in circuit across the power supply.

Inasmuch as the de-energizaion of the "down" relay and the energization of the "up" relay determines the up stroke of the shear blade, it then becomes apparent that the hold down pilot valve can function also during the up stroke of the blade. Therefore, as the blade travels upward on its return stroke, a free flow of liquid from the pressure tank will find its way to the hold down devices to urge the pistons to return to their normally extended positions, which will be determined by the clearance necessary for insertion of the work beneath the movable blade in preparation for a shearing operation.

The normally extended position of each hold down piston can be adjustably determined by inserting into each of the lines 213 leading from the upper end of each hold down cylinder, a variable choke 249, which may take the form of an adjustable needle valve. Such valve will function to limit the rate of flow of liquid from the pressure tank into each hold down device during the return stroke of the shear blade, and therefore the normal extended position of each piston when the blade reaches the upper limit of its return stroke.

In order to dispose of any liquid leaking past the pistons in any of the hold down cylinders, the vent fittings are connected to a common manifold 251 which in turn empties to a drain tank 253. Liquid accumulating in this tank may then be pumped through a line 254, back into the accumulator or pressure tank by means of a pump 255 which may take the form of a cylinder 257 mounted on a fixed portion of the machine, and a piston 259 affixed to the ram or movable blade whereby the piston will move in accordance with movements of the shear blade.

A check valve 261 between the drain tank 253 and the pump 255 precludes reverse flow during the work stroke of the pump and likewise, a check valve 263 in the line 254 precludes reverse flow from the pressure tank 219 to the pump 255 during such stroke.

A connection 265 from the upper end of the pump cylinder to the line 254 permits of liquid flowing in behind the piston during a work stroke and thereby precludes development of a vacuum condition. During the intake stroke of such piston, such liquid will be pumped out of the cylinder, and to assure that it does not enter the suction side of the pump cylinder, a second check valve 267 is placed in the line 254, between the discharge opening of the pump and the connection 265.

Working in conjunction with the hold down devices is a provision for assuring that the ram will, at all times, function under positive contact with the ways on which it rides.

A vertically moving ram will during moments of movement under no load conditions, tend to swing away from its associated ways, and this is particularly apt to be the case, when the ways are tilted to a slight angle as heretofore described. Further, under conditions developed when the hold down devices engage the work or work support, a small moment is created which tends to force the ram away from positive contact with the ways.

To counteract such tendencies, a pull back assembly 269 is connected between the ram at each end thereof and a fixed component of the machine, in this instance, the adjacent side wall of the frame. Such assembly involves a cylinder 271 pivotally secured at one end to the side wall and enclosing a piston 273 having a piston rod 275 extending through the other end of the cylinder for hinge connection to the ram, or more specifically, the stiffening rib. A spring 277 about that portion of the rod within the cylinder and under compression between the adjacent end of the cylinder and the piston, serves to hold the ram under light positive pressure against the ways, which pressure is adequate for no load conditions.

To build up such pressure, the cylinder is hydraulically connected by a flow line 279 to the same line that carries the liquid to and from the hold down devices. Thus, as the hold down devices engage the work or work support, the pressure built up therein by the driving movement of the ram, will at the same time be transmitted to the pull back assemblies, and such increased pressure will more than compensate for the effect of the turning moment created by the hold down devices during the period in which they function.

As a safety precaution against damage to the machine in the event the ram or blade, from some unforseeable cause, be tilted beyond the almost microscopic range taken care of by the micro-switches 169 and associated valves, there is provided circuit means for cutting power to the machine to bring the same to a halt.

This precautionary measure involves a pair of normally closed micro-switches 285, 287 disposed on either side of the pivot rod 175 in spaced relationship to the lower end thereof by a distance such as will necessitate a greater swing of said rod to actuate these switches than would be required to actuate the leveling switches 165, 167. These normally closed switches are in series in a main power lead 288 which carries current to the control circuits.

Between this lead and the opposing power lead is connected to the solenoid 289 of a normally open valve 291, which by reason of the fact that the micro-switches are normally closed, will be energized to its closed condition during normal operation of the machine. This valve opens to the tank 47 and has a pilot connection 293 to the relief valve 73 which, when open, serves to circumvent the spring setting of such relief valve and permit substantially free opening of said valve.

Thus when the valve 291 opens in response to opening of either one of the micro-switches 285 or 287, the output of the pump will be discharged directly back to the tank. At the same time, electrical power will be disconnected from the control circuits.

A normally open push button switch 295 in shunt across the series connected micro-switches will enable an operator to temporarily connect power to the machine if desired.

From the foregoing description of the invention, it will be apparent that the same fulfills the objects attributable thereto. While the same has been illustrated and described in its preferred form and in considerable detail, the invention is subject to alteration and modification without departing from the underlying invention and accordingly it is not desired that the scope of protection be limited to such details except as may be necessitated by the appended claim.

I claim:

A hydraulically operated shear machine comprising a frame; a normally substantially level shear blade having a sloping cutting edge whereby the load on said blade is concentrated on a small longitudinal increment of said edge and shifts progressively therealong during a shearing stroke of said blade; means included in said frame for supporting said shear blade for substantially vertical reciprocal movement; a hydraulic system for driving said blade, said hydraulic system including a pair of cylinder assemblies, each mounted on said frame in drive connection with said blade adjacent an end thereof and involving a cylinder and a piston reciprocally disposed therein, the effective area of one of said pistons exposed to operating fluid pressure during a shearing stroke being larger than the corresponding effective area of the other piston; means for supplying liquid under pressure from a single source to said cylinder assemblies in series; and means responsive to a tilt of said blade from its normally substantially level position solely during a retraction stroke thereof, for restoring said blade during said stroke to its normally substantially level condition, said means including a normally closed solenoid actuable valve in bypassing relationship to one of said cylinder assemblies as respects the supplying of pressure fluid thereto during a retraction stroke, a normally closed solenoid actuable valve in bypassing relationship to the other of said cylinder assemblies as respects the supplying of pressure fluid thereto during a retraction stroke, and means actuated by said blade in its tilted position during a retraction stroke for opening the bypass valve of the cylinder assembly at the advanced end of said blade until said normally substantially level condition is restored and renders said responsive means ineffective, thereby to avoid the effects of an accumulation of departures from the normal position of said blade.

References Cited in the file of this patent

UNITED STATES PATENTS

| | | |
|---|---|---|
| 1,616,856 | Huston | Feb. 8, 1927 |
| 2,286,798 | Flowers | June 16, 1942 |
| 2,302,132 | MacMillin et al. | Nov. 17, 1942 |
| 2,558,071 | Castle et al. | June 26, 1951 |
| 2,616,265 | Wilson | Nov. 4, 1952 |
| 2,781,844 | Pearson | Feb. 19, 1957 |

FOREIGN PATENTS

| | | |
|---|---|---|
| 1,137,783 | France | Jan. 21, 1957 |